United States Patent [19]
Bramberger et al.

[11] Patent Number: 5,971,429
[45] Date of Patent: Oct. 26, 1999

[54] STEERING WHEEL WITH INTEGRATED HORN SWITCH AND AIR BAG DEVICE

[75] Inventors: Peter Bramberger, Welshofen; Norbert Friedrich, Rauhenebrach; Wilfried Burghardt, Griesbeckerzell; Halit Ozek, Schwabhausen; Horst Herzing, Ergolding, all of Germany

[73] Assignee: Autoliv Development AB, Vargarda, Sweden

[21] Appl. No.: 08/901,869

[22] Filed: Jul. 29, 1997

[30] Foreign Application Priority Data

Jul. 29, 1996 [DE] Germany ............................ 196 30 497

[51] Int. Cl.⁶ ..................................................... B60R 21/20
[52] U.S. Cl. ......................................... 280/731; 280/728.3
[58] Field of Search ................... 280/728.3, 731

[56] References Cited

U.S. PATENT DOCUMENTS

| | | | |
|---|---|---|---|
| 4,325,568 | 4/1982 | Clark et al. | 280/731 |
| 4,934,735 | 6/1990 | Embach | 280/731 |
| 5,235,146 | 8/1993 | Suzuki | 200/61.54 |
| 5,371,333 | 12/1994 | Kanai et al. | 280/731 |
| 5,413,376 | 5/1995 | Filion et al. | 280/728.3 |

FOREIGN PATENT DOCUMENTS

| | | |
|---|---|---|
| 0586055 | 3/1994 | European Pat. Off. . |
| 4034539 | 5/1991 | Germany . |
| 19609130 | 9/1996 | Germany . |

*Primary Examiner*—Kenneth R. Rice
*Attorney, Agent, or Firm*—Robert W. Becker & Associates

[57] ABSTRACT

A steering wheel for motor vehicles is provided and has a horn switch that is disposed thereon as well as an air bag device that has a receiving chamber for receiving a gas generator as well as an air bag that is folded therein. The opening of the receiving chamber is closed off by a protective cover that has a predetermined breaking point and that can be opened when the device is activated by the inflating air bag. To carry out a honking function, the protective cover is disposed so as to be relatively movable. The receiving chamber for the air bag is closed off by a hold-down part that absorbs the packing pressure, is held in place on the receiving chamber, and opens as a consequence of the inflating air bag. To be able to open, the hold-down part is provided with a predetermined breaking point.

14 Claims, 3 Drawing Sheets

STEERING WHEEL WITH INTEGRATED HORN SWITCH AND AIR BAG DEVICE

BACKGROUND OF THE INVENTION

The present invention relates to a steering wheel for motor vehicles, with a horn switch disposed therein as well as with an air bag device that has a receiving chamber for receiving a gas generator as well as an air bag that is folded therein; the opening of the receiving chamber is closed off by a protective cover that has a predetermined breaking point and can be opened in the event of activation of the device by the inflating air bag.

An air bag device having such features is known in a particular construction from EP 0 586 055 A1. With this known construction, one or more horn switches are disposed between the steering wheel structure and the container with which the protective cover is connected. This known construction has the drawback that on the one hand in order to operate the horn the entire unit, comprising the protective cover and a container, must be pressed down, and on the other hand unfortunately the entire unit must be mounted in such a way as to be vibration free relative to the steering wheel structure, which necessitates appropriately strong horn springs that in turn themselves inherently have corresponding operating drawbacks because in general an easy actuation of the horn is desired.

It is therefore an objects of the present invention to provide an air bag device of the aforementioned general type that is easy to manufacture and to mount, while at the same time ensuring a reliable operation of the horn switch.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
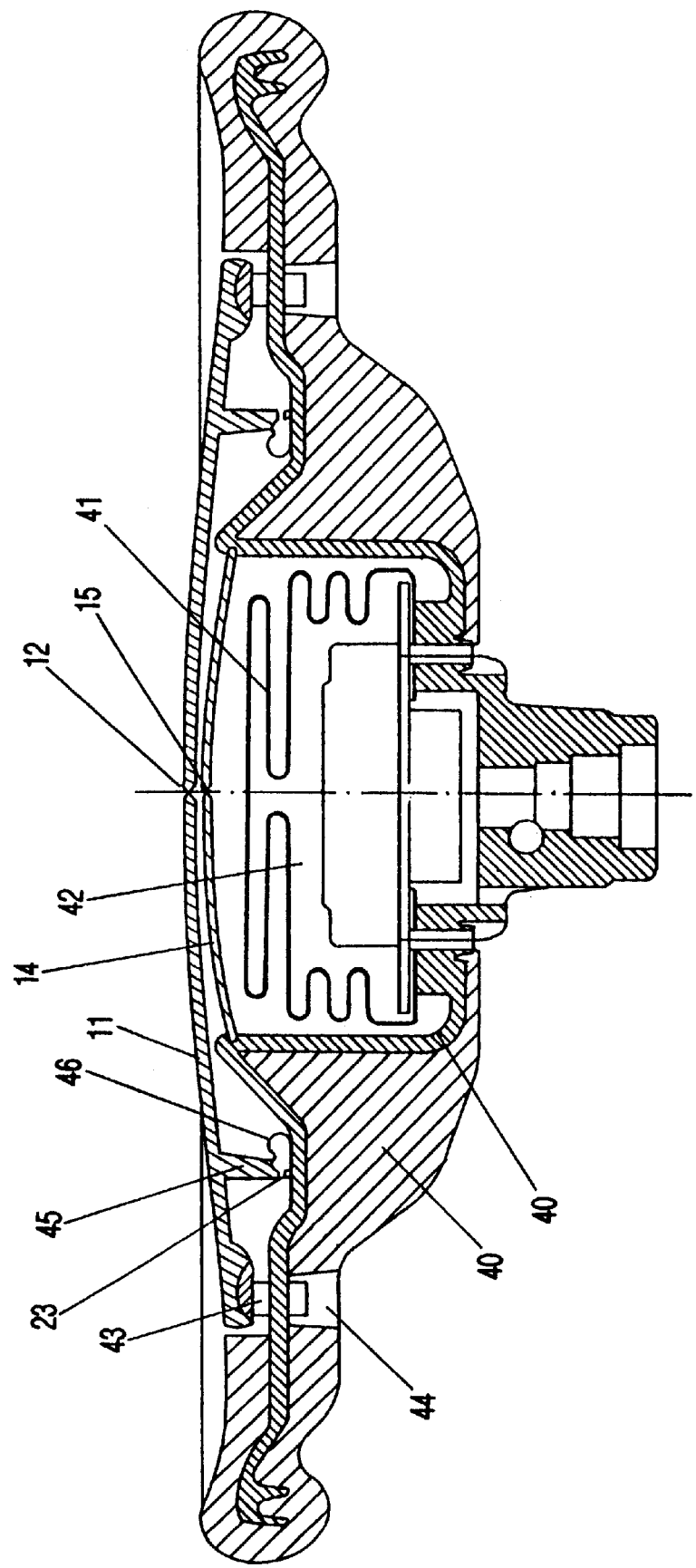
FIG. 1 is a cross-sectional view of one exemplary embodiment of the inventive steering wheel with an air bag device and horn switch.

The steering wheel of the present invention is characterized primarily in that the protective cover is displaceable relative to the steering wheel structure and the receiving chamber of the air bag device disposed therein, and the horn switch is acted upon by the protective cover, which is operated by manual pressure; furthermore, in order to ensure the operation of the horn, the receiving chamber is closed by a hold-down means that absorbs the packing pressure exerted by the air bag that is folded in the receiving chamber, with the hold-down means being held in position on the receiving chamber and opening as a consequence of the inflating air bag, for which purpose the hold-means is provided with a breaking point means to allow it to open.

The steering wheel of the present invention has the advantage that the air bag device and the protective cover can be manufactured and mounted together without regard to the integration of a horn switch; since the horn switch is disposed on the steering wheel structure, independently of the air bag device, its simple mounting is ensured, whereby in an advantageous manner there is eliminated due to the hold-down means the packing pressure that originates from the air bag that is folded in a receiving chamber and that in practice partially varies to a great degree. Thus, despite the fact that the horn switch is disposed between the protective cover and the steering wheel structure, its reliable functioning is ensured.

Pursuant to a first specific embodiment of the present invention, the receiving chamber of the air bag device is formed by a recessed part in the steering wheel structure, and the horn switch is disposed between the protective cover and the steering wheel structure that carries the protective cover.

If the air bag device that is to be integrated into the steering wheel is provided with a container for receiving the folded up air bag, the receiving chamber of the air bag device comprises a separate container that is integrated into the steering wheel structure and the horn switch is disposed between the protective cover and the upper rim of the container.

This arrangement results in the advantage of a straightforward mounting of the horn switch since the rim portions of the container on the one hand, and the protective cover on the other hand, are easily accessible. If with this type of gas bag device, where the protective cover is movable relative to the container, an easy-to-achieve movement of the protective cover against the container is carried out in order to activate the horn switch, the folded-in air bag is held in position by the additionally provided intermediate layer.

Due to the low mass of the protective cover, the horn springs, which act between the protective cover and the container, can also be provided with low spring forces, so that the operating forces for the horn or honking function are correspondingly low.

Pursuant to another specific embodiment of the present invention, the horn switch can be disposed between the protective cover and the upper rim of the container, whereby as a substitute for the upper rim, another component in the form of an abutment that is fixedly connected to the container could also be provided.

Pursuant to another embodiment of the present invention, the horn switch is formed by two horn contacts that are disposed on the upper rim of the container and on the underside of a rib or similar member that projects from the protective cover and is directed toward the container rim. Disposed on the rim is a compression spring that is supported between the protective cover and the container rim and that spaces the protective cover from the container. In this connection, a further specific embodiment of the present invention provides that for forming a pivot or hinge configuration, the intermediate layer, by means of extensions that are disposed on its outer rim, extends through associated openings in the container wall; by means of external widened parts that are associated with the extensions the intermediate layer is held on the container, whereby on an inner side, next to the container wall, the extensions are provided with respective recessed portions to produce an articulation for the pivoting up of the parts of the intermediate layer. This has the advantage that on the one hand the intermediate layer can be held in position during mounting to the container without additional auxiliary means, and on the other hand, however, the parts of the intermediate layer which can be separated at the provided breaking point when the air bag unfolds, are reliably held on the container.

Pursuant to further specific embodiments of the present invention, the intermediate layer can have the shape of a square or rectangular crosspiece that spans the container, or it is possible for the intermediate layer to have a greater width in its central region that spans the inner chamber of the container than in the region where it is suspended on the container walls.

As an alternative to a one-piece hold-down means that is provided with a predetermined breaking point, it is also possible for the hold-down means to be formed by two segmented plates that are resistant to bending, whereby the outer edge portions of the plates are respectively introduced into a recess of the container wall or of the steering wheel structure, where they are held in place by the protective cover.

So that when the air bag device is activated the plates that form the hold-down means and to this extent are loose plates are not released, it is provided that the two plates be connected by means of associated connecting ribs or similar members to respective one of the associated parts of the protective cover, which is split by the predetermined breaking point. In this way, the plates pivot up together with the parts of the protective cover and are held in place on the protective cover when the air bag unfolds.

Depending upon the flexibility of the material that is used for producing the protective cover, it is possible for the connecting ribs to be introducible into the plates on the protective cover and in the opposite direction to be held in place on the plates, whereby it is expedient that the connecting ribs disposed on the protective cover be connected by snap connections to the two plates that form the hold-down means.

In order to ensure an adequate holding down of the air bag that is folded into the inner chamber of the container, the abutting edge portions of the two plates can be provided with an overlap that is formed by overlapping offsets.

Further specific features of the present invention will be described in detail subsequently.

DESCRIPTION OF PREFERRED EMBODIMENTS

Referring now to the drawings in detail, the embodiment illustrated in FIG. 1 shows a protective cover 11 that is disposed on a steering wheel structure 40; the protective cover 11 is displaceable relative to the structure 40. A receiving chamber 42 for accommodating an air bag 41 that is folded therein is disposed in the steering wheel structure 40. The open side of the receiving chamber 42 is spanned toward the outside by the protective cover 11, which is provided with a predetermined breaking point 12 for opening the cover when the air bag device is activated. In the illustrated embodiment, the steering wheel structure 40 includes the securement of the steering wheel to the steering column as well as embedment of the steering wheel in foam material.

By means of pins 43 that are longitudinally displaceably guided in appropriate bores 44, the protective cover 11 is mounted on the steering wheel structure 40 so as to float relative thereto. As a consequence, manual pressure at any location on the cover 11 results in a longitudinal displacement of the cover relative to the steering wheel structure 40.

For supporting the protective cover 11 on the steering wheel structure 40, springs 46 are disposed between ribs or similar members 45, which project from the cover 11 in a direction toward the structure 40, and an associated surface of the steering wheel structure 40. Disposed on faces of the ribs 45 are horn contacts 23 which come into contact with one another when the protective cover 11 is pressed in, thereby closing a circuit and activating the horn.

In order to ensure that the protective cover 11 can easily move relative to the steering wheel structure 40, the receiving chamber 42, which is open toward the protective cover 11 and has folded therein the air bag 41, is covered by an intermediate layer 14 that in turn is also provided with a predetermined breaking point 15 that when the air bag unfolds permits an opening of the intermediate layer 14 in the same manner as provided for the protective cover 11.

Figure 2:
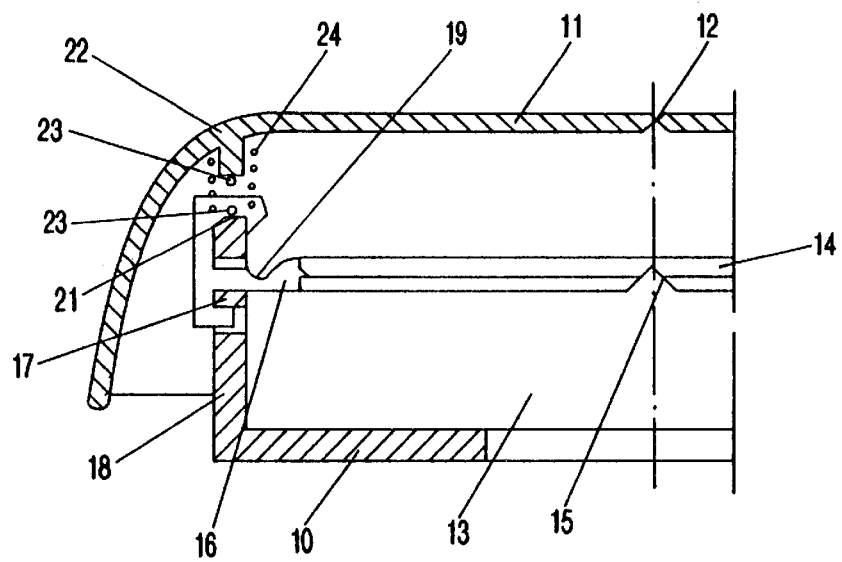
FIG. 2 is a cross-sectional view of another exemplary embodiment of an inventive air bag device that is to be mounted in a steering wheel and has a container, protective cover and horn switch.
Figure 3:
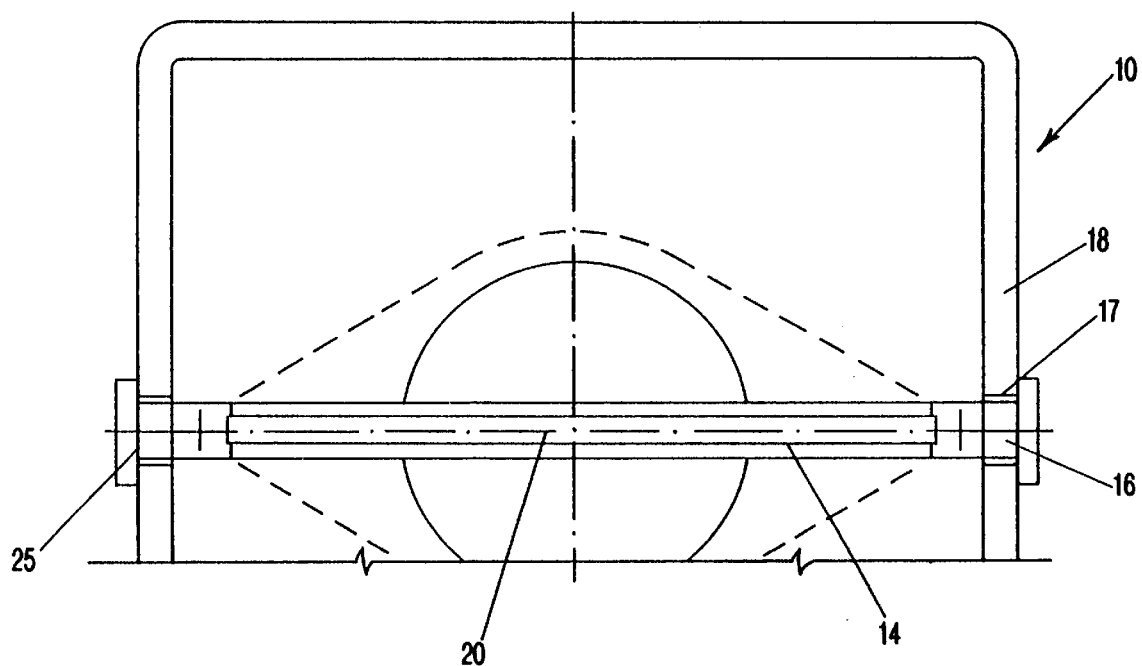
FIG. 3 is a plan view of the container of FIG. 2 with a hold-down means.

In the embodiment illustrated in FIGS. 2 and 3, the air bag device comprises a separate container 10 that is to be secured to the steering wheel structure 40. The container 10 has an inner chamber 13 that is surrounded by lateral container walls 18; the air bag, which in this view is not shown in detail, is folded in the inner chamber 13.

Also with this embodiment, the inner chamber 13, with the air bag folded therein, is covered by the intermediate layer 14, which also has a predetermined breaking point 15.

The intermediate layer 14 is held in position on the container 10 by means of lateral extensions 16 that engage in openings or holes 17 provided in the container walls 18. The outer end of the extension 16 ends in an outwardly disposed widened part 25 that ensures that the intermediate layer 14 will be held in position on the container 10. To form the necessary articulation so that the associated parts of the intermediate layer 14 can pivot up, the extensions 16 are provided with a recessed portion 19.

The horn switch is disposed between the upper rim 21 of the container 10 and a rib or similar member 22 of the protective cover 11 that projects toward the rim 21 and is aligned therewith; the horn switch is in the form of two horn contacts 23 that are secured to the two aforementioned components 21 and 22. In addition, a compression spring 24 is provided that is supported between the upper rim 21 and the rib 22, and spaces the protective cover 11 from the container 10.

When pressure is applied to the protective cover 11, this cover shifts relative to the container 10, so that the horn contacts 23 come to rest against one another and the horn is activated. In this connection, the movement of the protective cover 11 is not obstructed by the air bag, which is folded in the inner chamber 13 of the container 10 and thereby exerts a certain amount of packing pressure; this lack of obstruction results from the fact that the air bag is held in position in the inner chamber 13 by the intermediate layer 14. If the air bag device is activated, the unfolding air bag breaks the intermediate layer 14 at its breaking point 15, where-upon the thus-formed parts of the intermediate layer 14 can pivot out in the manner of a hinge design, yet continue to be held on the container walls 18.

As shown in FIG. 3, it suffices that the intermediate layer 14 is embodied as a crosspiece 20 that spans the inner chamber 13 of the container 10. However, as shown by the dashed-line representation, the intermediate layer 14 can also be wider in its middle region than in its end regions, thereby improving the means for holding the air bag down.

Figure 4:
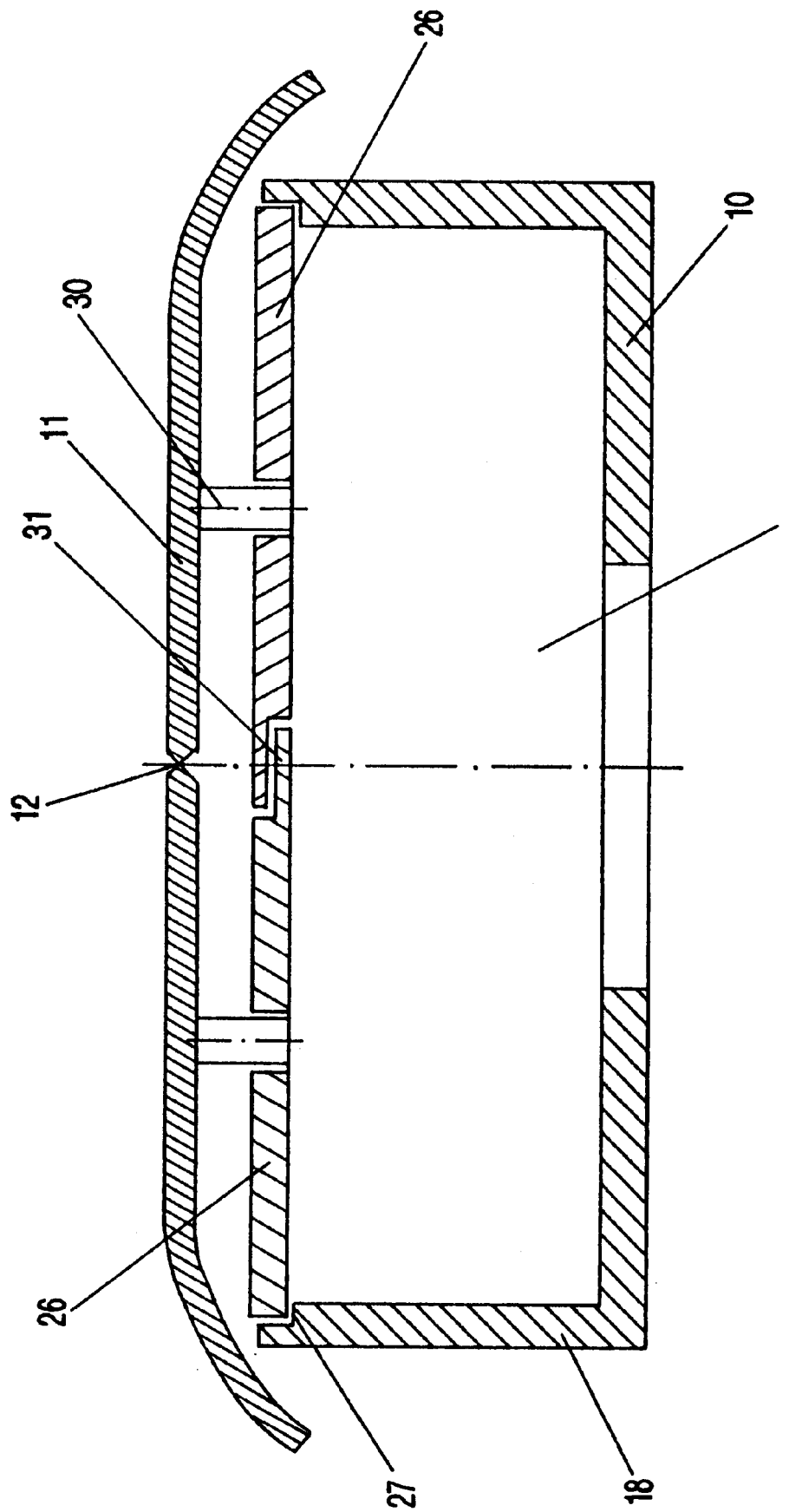
FIG. 4 is a view similar to that of FIG. 2 showing another exemplary embodiment that is suitable for use with the steering wheel of FIG. 1.

FIG. 4 illustrates a specific embodiment of the present invention where the hold-down means is formed by two plates 26, the outer edge portions of which are introduced into recesses 27 of the container walls 18. The central, abutting portions of the two plates 26 are provided with an overlap 31, which is formed by appropriately associated offsets, so that when the air bag unfolds the plates 26 can easily open.

In order when the plates 26 open as a consequence of the unfolding air bag to prevent the plates 26 from being flung into the vehicle, the plates 26 are connected by connecting ribs or similar members 30 to the associated parts of the protective cover 11 that are held in position by the predetermined breaking point 12. Although not shown in detail, to connect the connecting ribs 30 to the plates 26, a snap connection is provided; however, depending upon the material that is used for the protective cover 11, it is also possible to make the connecting ribs 30 displaceable relative to the plates 26.

The present invention is, of course, in no way restricted to the specific disclosure of the specification and drawings, but also encompasses any modifications within the scope of the appended claims.

We claim:

1. A steering wheel for motor vehicles, comprising:
   a steering wheel structure that is provided with a horn switch and a receiving chamber for an air bag device that includes a gas generator and an air bag that is folded in said receiving chamber;
   a protective cover for closing off an opening of said receiving chamber, said protective cover having a predetermined breaking point means for opening of said protective cover due to inflation of said air bag upon activation thereof, wherein said protective cover is, in its entirety, displaceable relative to said steering wheel structure and said receiving chamber thereof, and wherein said protective cover is operable by manual pressure for activating said horn switch;
   wherein said horn switch is formed by at least two horn contacts that are disposed opposite one another on said displaceable protective cover and on said steering wheel structure, respectively; and
   a hold-down means that is held in position on said receiving chamber for additionally closing off the same, wherein said hold-down means absorbs packing pressure exerted by said air bag folded in said receiving chamber, and wherein said hold-down means is adapted to be opened by inflation of said air bag, for which purpose said hold-down means is provided with further predetermined breaking point means.

2. A steering wheel according to claim 1, wherein said receiving chamber for said air bag device is formed by a recessed portion in said steering wheel structure, and wherein said horn switch is disposed between said protective cover and said steering wheel structure that carries said protective cover.

3. A steering wheel according to claim 1, wherein said receiving chamber for said air bag device comprises a separate container that is integrated into said steering wheel structure, wherein said horn switch is disposed between said protective cover and an upper rim of said container.

4. A steering wheel according to claim 3, which includes a rib means that projects from said protective cover toward said rim of said container, wherein said horn means is formed by at least two horn contacts that are disposed on said upper rim of said container and on an underside of said rib means, and wherein a compression spring is disposed on said rib means, is supported between said protective cover and said rim of said container, and spaces said protective cover from said container.

5. A steering wheel according to claim 3, wherein said hold-down means is in the form of an intermediate layer that is resistant to bending and is held in place on side walls of said container by means of an articulation structure.

6. A steering wheel according to claim 5, wherein to form said articulation construction said intermediate layer is provided on outer edges thereof with extensions for extending through associated openings in said walls of said container, and wherein said extensions are provided with outer widened parts for holding said intermediate layer on said container, and wherein inner sides of said extensions, next to said walls of said container, are respectively provided with a recessed portion for forming an articulation for pivoting-up parts of said intermediate layer.

7. A steering wheel according to claim 6, wherein said intermediate layer has the shape of a rectangular crosspiece that spans an inner chamber of said container.

8. A steering wheel according to claim 6, wherein a central portion of said intermediate layer that spans an inner chamber of said container is wider than that portion of said intermediate layer that is suspended on said walls of said container.

9. A steering wheel according to claim 3, wherein said hold-down means is formed by two plates that are resistant to bending, are segmented, and have outer edge portions that are introduced into respective recesses of said wall of said container or of said steering wheel structure, wherein said plates are held in position by said protective cover.

10. A steering wheel according to claim 9, wherein said two plates are, by means of associated connecting rib means, respectively connected with associated parts of said protective cover, which is split by said breaking point means.

11. A steering wheel according to claim 10, wherein said connecting rib means are adapted to be introduced from the direction of said protective cover into said plates, where they are held in position in a counter direction.

12. A steering wheel according to claim 10, wherein said connecting rib means are disposed on said protective cover and are connected by snap connections to said two plates that form said hold-down means.

13. A steering wheel according to claim 9, wherein abutting edge regions of said two plates are provided with an overlap formed by overlapping offsets.

14. A steering wheel according to claim 1, wherein said protective cover is made of a rigid material.

* * * * *

UNITED STATES PATENT AND TRADEMARK OFFICE
CERTIFICATE OF CORRECTION

PATENT NO. : 5,971,429

DATED : October 26, 1999

INVENTOR(S) : Peter Bramberger, Norbert Friedrich, Wilfried Burghardt, Halit Özek, and Horst Herzing It is certified that error appears in the above-identified patent and that said Letters Patent is hereby corrected as shown below:

Title page, item [75] should read as follows:

[75] Inventors:

Peter Bramberger, Norbert Friedrich, Wilfried Burghardt, Halit Özek, and Horst Herzing Signed and Sealed this Sixteenth Day of May, 2000

Attest:

Q. TODD DICKINSON

Attesting Officer

Director of Patents and Trademarks